Sept. 9, 1941.  H. A. ORTEGREN ET AL  2,255,625
FEEDER FOR BEARING MEMBERS
Original Filed Dec. 8, 1937  3 Sheets-Sheet 1

Herman A. Ortegren,
Charles C. Howenstine,
INVENTORS

BY

ATTORNEY.

Sept. 9, 1941.   H. A. ORTEGREN ET AL   2,255,625
FEEDER FOR BEARING MEMBERS
Original Filed Dec. 8, 1937   3 Sheets-Sheet 2

Herman A. Ortegren,
Charles C. Howenstine,
INVENTORS
BY
ATTORNEY.

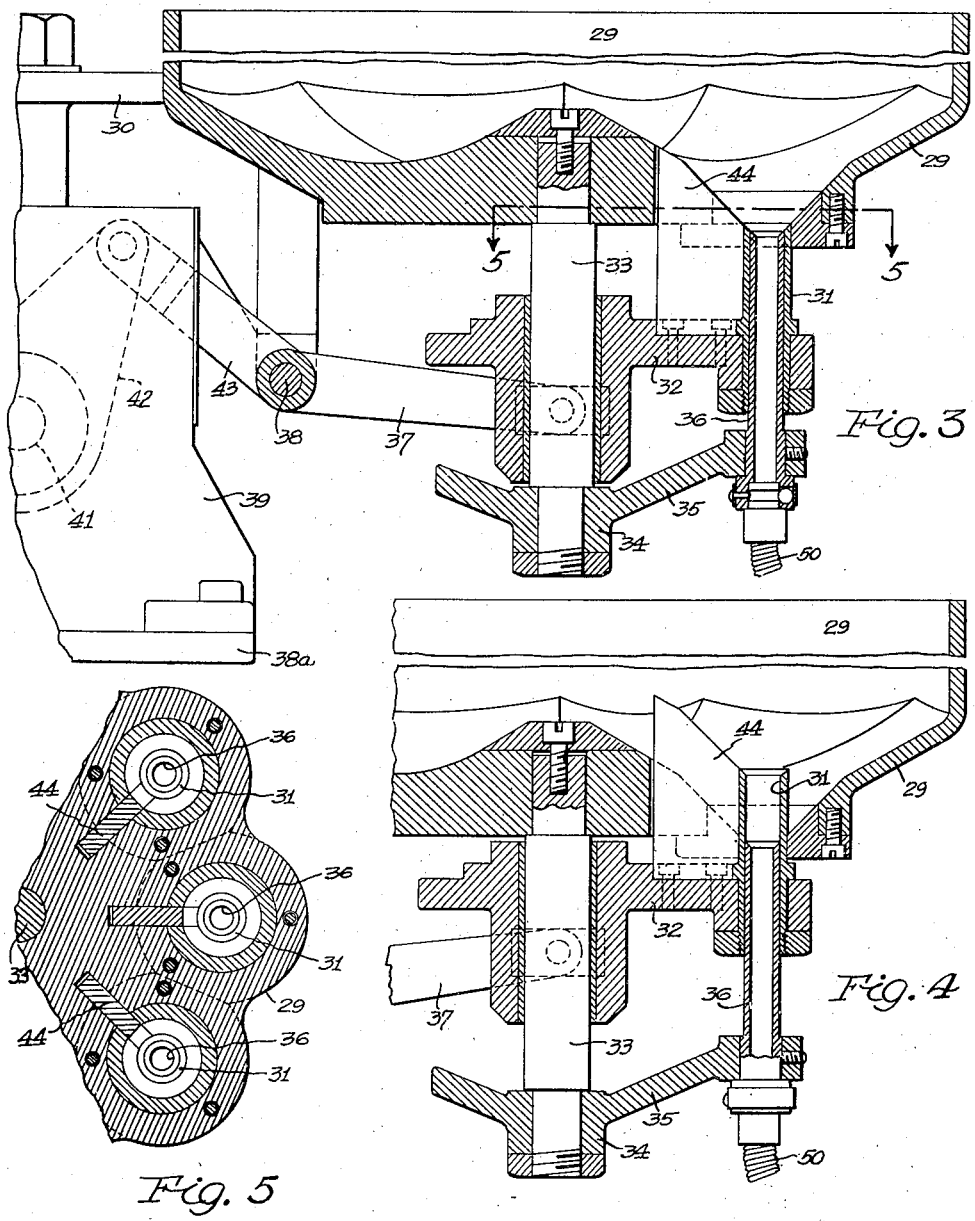

Patented Sept. 9, 1941

2,255,625

UNITED STATES PATENT OFFICE 2,255,625

FEEDER FOR BEARING MEMBERS

Herman A. Ortegren and Charles C. Howenstine, Detroit, Mich., assignors to Bower Roller Bearing Company, Detroit, Mich., a corporation of Michigan Original application December 8, 1937, Serial No. 178,784. Divided and this application August 22, 1939, Serial No. 291,300

4 Claims. (Cl. 221—118)

This invention relates, in general, to roller bearing assembling machines and, in particular, to feeder means for the bearing members used in such machines, this being a division of our application which was filed on December 8, 1937, Serial No. 178,784, and issued into Patent No. 2,235,084 on March 18, 1941.

An object of the present invention is to provide a new and improved roller bearing assembling machine which distributes the roller members from the source thereof more efficiently and easily than heretofore.

Another object is to improve a roller bearing assembling machine so that the distribution of the rolls from their source of supply to the positions whereat the first step of the assembling process is to be performed is effectuated automatically, efficiently and without danger of jamming or other acts which would interrupt desired continuous operation of said machine.

Another object is to provide a roller bearing assembling machine with a new and improved device for supplying the rolls for the bearings to the initial station of the process in a simpler manner than heretofore and without need for attention or fear of unintentional interruptions in its operation.

Other objects and advantages of the invention will become readily apparent from a reference to the following specification taken in conjunction with the accompanying drawings wherein:

Figure 3 is a section taken along the lines 3—3 in Figure 2;

Figure 4 is a view similar to Figure 3 but shows the movable parts in raised position; and Figure 5 is a section taken along the line 5—5 in Figure 3.

Figure 1:
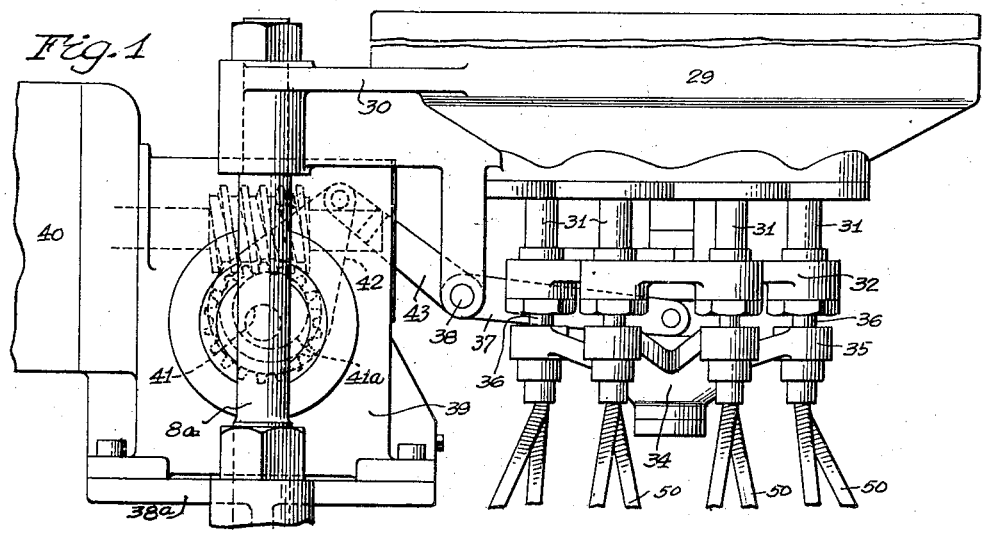
Figure 1 is an elevational view of that portion of the machine in which an embodiment of the invention is incorporated.
Figure 2:
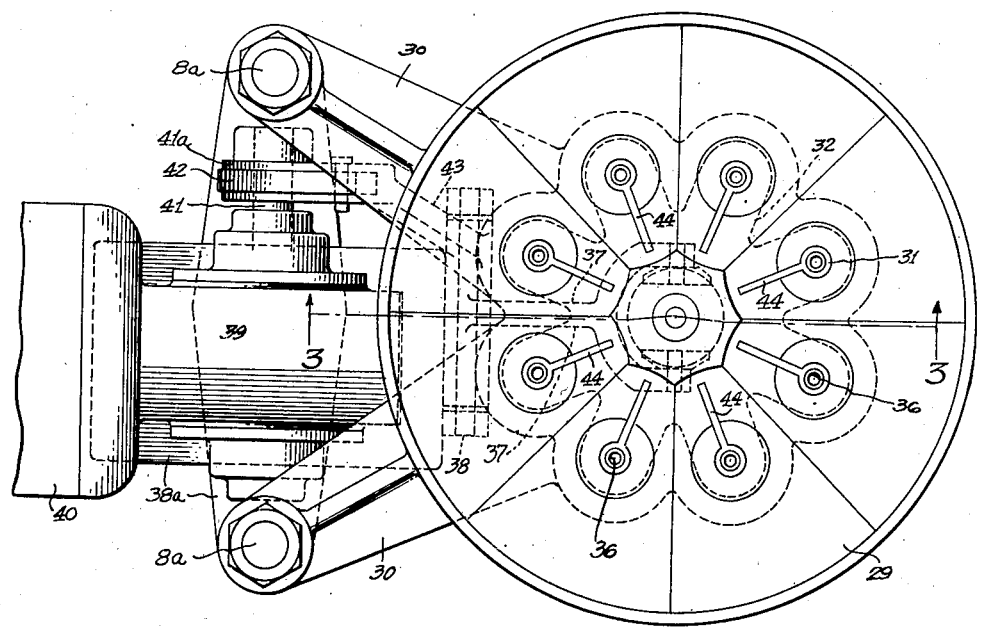
Figure 2 is a plan view.

Reference to our aforementioned application (patent) will show that the machine in its entirety consists, generally, of a feeding mechanism (which comprises the subject matter of the present application), a sorting mechanism (which is in communication with said feeding mechanism and operable for receiving the rollers discharged therefrom and arranging same into proper positions for the next operation) and an assembling mechanism (which is in communication with said sorting mechanism and operable for receiving the properly positioned rollers therefrom and arranging same into properly assembled positions within the cages and/or race members therefor).

So, because of the fullness of disclosure in the previous application and because of the present desire to seek protection covering only the above-mentioned feeding mechanism, the present application is limited as nearly as is practical to that subject matter which will provide for a clear, though substantially exclusive, understanding of said feeding mechanism, it being submitted that any fuller understanding, if desired, can be readily obtained by referring to said previous application.

Therefore, in following the above intention to restrict the present disclosure to the claimed subject matter, that is, to the portion of the machine which deals with the rollers at substantially their source and sends them on their way to the sorting phase of the assembling operation, it will be seen that said machine includes a pair of fixed, vertically upstanding supporting posts 8a by which said portion, or superstructure, is supported. The upper end of each of the posts 8a fixedly carries an end of a radially extending arm 30, and the free ends of these arms are integrated with the side wall of a hopper 29 into which a supply of loose, pre-formed roller bearing members is chargeable, said hopper being thereby supported rigidly and fixedly at the upper end of the machine proper.

The lower or bottom side of hopper 29 is provided with a series of substantially circular openings or apertures constituting outlets through which the rollers therewithin may be discharged therefrom, and these outlets are annularly spaced concentrically about the central axis of said hopper which may be represented by the continuation of the axis of a vertical shaft 33 fixedly secured at its upper end to said hopper bottom and at its lower end to the central portion of a spider 34 having a plurality of radial arms 35 equal in number and in inter-spacing to said outlets. And, freely projecting into each of the above mentioned outlet openings is a tubular plunger 31, these plungers being fixedly mounted within the outer ends of the radial arms of a spider 32 carried on shaft 33 for vertical sliding movement therealong between the hopper bottom and the aforementioned spider 34, the number and inter-spacing of the arms of the movable spider 32 clearly equalling the number and inter-spacing of the arms of the stationary spider 34.

Each of the stationary spider arms 35 fixedly carries the lower end of a feed tube 36 (to each of which ends is attached the upper end of a flexible conduit 50 intercommunicating, as can be seen in our previous application, hopper 29 and the sorting mechanism of the machine), and these feed tubes extend upwardly from said arms through the movable plungers 31 directly thereabove into fixed and substantially flush relation with the outlets in hopper 29.

Spider 32, which carries plungers 31 for movement therewith, is moved vertically along shaft 33 by means of a fork 37 pivotally supported at 38 upon a bracket extending downwardly from the hopper bottom. A frame member 38a is rigidly supported upon posts 8a intermediate their ends, and upon this member is mounted a motor support 39 carrying an electric motor 40 from the shaft of which motion is transmitted in any suitable manner to a cross shaft 41 about which is secured a cam 41a for operating a crank arm 42 the upper end of which is pivotally connected to an extension arm 43 of fork 37. The spider-plunger unit 32—31 is, therefore, raised and lowered relatively to shaft 33 by the operation of motor 40, and the plungers of said unit will be moved upwardly and downwardly within the hopper outlets relatively to the feed tubes 36. Since plungers 31 and feed tubes 36 are tubular and telescopically arranged with respect to each other, the loose rolls within hopper 29 will feed into the upper open ends of the former and pass downwardly through the latter into the conduits 50 attached thereto.

Though the loose rolls within hopper 29 are continually agitated by the movements of plungers 31 so as to aid said rolls in finding their way into said plungers, it is proposed to augment such agitation by employing a plurality of agitator blades 44. These blades are carried on the upper sides of the movable spider arms for movement therewith, extending radially inwardly from plungers 31 and vertically upwardly from said arms, and their upper end surfaces are sloped downwardly in a radially outward direction so that the outer, lower ends of said surfaces reside substantially at and level with the outlet openings in hopper 29. It is intended that these blades 44 project into and out of the hopper responsive to actuation of spider-plunger unit 32—31 and, for this reason, a plurality of radially elongated, arcuately spaced apertures is formed in the bottom wall of said hopper for receiving said blades, each of said apertures openings at its outer end into the circular outlet respective thereto and extending radially therefrom toward the hopper axis for at least a distance equal to the radial length of the respective blade. Therefore, as the several plungers 31 are moved upwardly and projected through the hopper outlets, blades 44 will also be moved upwardly through the hopper openings provided therefor and contact the rolls, thus agitating same to cause them to find their way into said plungers.

Although the invention has been described with some detail, it is to be understood that such description is for the purpose of illustration only and is not to be taken as being definitive of the limits of the inventive idea. The right is reserved to make such changes in the details of construction and arrangement of parts as will fall within the purview of the attached claims.

What I claim is:

1. In a device for handling bearing members, a hopper for containing bearing members and having a bottom wall, said wall being formed with a plurality of substantially circular apertures annularly spaced about the center thereof and providing outlets through which the members may be discharged from said hopper, said wall also being formed with a plurality of elongated, arcuately spaced apertures opening into said circular apertures and extending radially therefrom toward said center, a shaft secured to said wall substantially at said center and extending therebelow, a pair of spiders carried on said shaft one fixedly and the other for movement therealong and each being integrally formed with a plurality of radially extending arms arcuately spaced similarly as said elongated apertures and in vertical alignment therewith and with said circular apertures, each pair of aligned arms carrying a discharge tube extending into the circular aperture aligned therewith and being fixed with respect to said hopper and said fixed spider, each arm on said movable spider carrying for movement therewith a discharge tube telescopically arranged about the respective first mentioned tube carried thereby and extending into the respective circular aperture, and a plurality of upstanding, radially elongated agitator blades each carried by one of said arms of said movable spider for movement therewith and extensible into said hopper through the respective elongated aperture.

2. In a device for handling bearing members, a hopper for containing bearing members and having a bottom wall, said wall being formed with a plurality of substantially circular apertures annularly spaced about the center thereof and providing outlets through which the members may be discharged from said hopper, said wall also being formed with a plurality of elongated, arcuately spaced apertures opening into said circular apertures and extending radially therefrom toward said center, a shaft secured to said wall substantially at said center and extending therebelow, a pair of spiders carried on said shaft one fixedly and the other for movement therealong and each being integrally formed with a plurality of radially extending arms arcuately spaced similarly as said elongated apertures and in vertical alignment therewith and with said circular apertures, each pair of aligned arms carrying a discharge tube extending into the circular aperture aligned therewith and being fixed with respect to said hopper and said fixed spider, each arm on said movable spider carrying for movement therewith a discharge tube telescopically arranged about the respective first mentioned tube carried thereby and extending into the respective circular aperture, and a plurality of upstanding, radially elongated agitator blades each carried by one of said arms of said movable spider for movement therewith and extensible into said hopper through the respective elongated aperture, the upper end of each of said blades having a surface sloping downwardly in a radial direction toward the respective circular aperture.

3. In a device for handling bearing members, a hopper for containing bearing members and having a bottom wall, said wall being formed with a plurality of substantially circular apertures annularly spaced about the center thereof and providing outlets through which the members may be discharged from said hopper, said wall also being formed with a plurality of elongated, arcuately spaced apertures opening into said circular apertures and extending radially therefrom toward said center, a shaft secured to said wall substantially at said center and extending therebelow, a pair of spiders carried on said shaft one fixedly and the other for movement therealong and each being integrally formed with a plurality of radially extending arms arcuately spaced similarly as said elongated apertures and in vertical alignment therewith and with said circular apertures, each arm on said fixed spider fixedly carrying a discharge tube extending through the arm on said movable spider in alignment therewith into the circular aperture aligned therewith, each arm on said movable spider carrying for movement therewith a discharge tube telescopically arranged about the respective first mentioned tube and extending into the respective circular aperture, and a plurality of upstanding, radially elongated agitator blades each carried by one of said arms of said movable spider for movement therewith and extensible into said hopper through the respective elongated aperture.

4. In a device for handling bearing members, a hopper for containing bearing members and having a bottom wall, said wall being formed with a plurality of substantially circular apertures annularly spaced about the center thereof and providing outlets through which the members may be discharged from said hopper, said wall also being formed with a plurality of elongated, arcuately spaced apertures opening into said circular apertures and extending radially therefrom toward said center, a shaft secured to said wall substantially at said center and extending therebelow, a pair of spiders carried on said shaft one fixedly and the other for movement therealong and each being integrally formed with a plurality of radially extending arms arcuately spaced similarly as said elongated apertures and in vertical alignment therewith and with said circular apertures, each arm on said fixed spider fixedly carrying a discharge tube extending through the arm on said movable spider in alignment therewith into the circular aperture aligned therewith, each arm on said movable spider carrying for movement therewith a discharge tube telescopically arranged about the respective first mentioned tube and extending into the respective circular aperture, and a plurality of upstanding, radially elongated agitator blades each carried by one of said arms of said movable spider for movement therewith and extensible into said hopper through the respective elongated aperture, the upper end of each of said blades having a surface sloping downwardly in a radial direction toward the respective circular aperture.

HERMAN A. ORTEGREN.
CHARLES C. HOWENSTINE.